United States Patent [19]

Shigeno

[11] Patent Number: 5,289,122

[45] Date of Patent: Feb. 22, 1994

[54] MAGNETIC SENSOR FOR DETECTING COARSE AND FINE MAGNETIC PATTERNS

[75] Inventor: Yoshiharu Shigeno, Yokohama, Japan

[73] Assignee: Murata Mfg. Co., Ltd., Nagaokakyo, Japan

[21] Appl. No.: 897,386

[22] Filed: Jun. 12, 1992

[30] Foreign Application Priority Data

Jun. 17, 1991 [JP] Japan ............................ 3-045338[U]

[51] Int. Cl.$^5$ .................. G01R 33/06; G06K 7/08; G06K 9/00; H01L 43/08
[52] U.S. Cl. .................................. 324/252; 209/534; 235/449; 324/207.21; 324/235; 338/32 R; 340/825.34; 382/7
[58] Field of Search .................. 324/173, 174, 207.21, 324/235, 252; 307/309; 360/113; 338/32 R; 382/7; 235/449, 493; 209/534, 562–564, 567; 340/825.3, 825.34

[56] References Cited

U.S. PATENT DOCUMENTS

| 4,039,936 | 8/1977 | Jones et al. ................. 324/207.21 |
| 4,255,708 | 3/1981 | Wilson, III ................. 324/252 X |
| 4,480,248 | 10/1984 | Sudo et al. ................. 324/252 X |
| 4,954,803 | 9/1990 | Iijima et al. ................. 324/32 R |

FOREIGN PATENT DOCUMENTS

753741  2/1967  Canada ........................... 324/252

Primary Examiner—Gerard R. Strecker

[57] ABSTRACT

A magnetic sensor. A plurality of sensing parts are deposited and formed on an element substrate in film form. The inside two of the sensing parts are connected in series to use for a reading of a narrow pitch magnetic pattern, and the outside two of the sensing parts are also connected in series to use for a reading of a wide pitch magnetic pattern. The connection of the sensing parts is carried out by using terminals and wires. The terminals are provided so as to short-circuit the ends of the sensing parts or for every sensing part.

23 Claims, 7 Drawing Sheets

MAGNETIC SENSOR FOR DETECTING COARSE AND FINE MAGNETIC PATTERNS

BACKGROUND OF THE INVENTION i) Field of the Invention

The present invention relates to an improvement of a magnetic sensor composed of a magnetoresistance element, which is capable of detecting coarse and fine magnetic patterns such as magnetic inks printed on a bank bill or the like.

ii) Description of the Related Arts

Conventionally, a magnetoresistance element is known. The magnetoresistance element includes a sensing part formed, for example, of indium antimony (InSb) and possessing the property of outputting a voltage having a certain level corresponding to a magnetic field applied.

When a magnetic sensor is formed by using a magnetoresistance element, usually, a plurality of sensing parts are arranged in parallel on an element substrate. The sensing parts are deposited and formed on the substrate by, for example, an etching, a vapor deposition processes. Further, on the rear side of the substrate, a magnet for example, is arranged for a magnetic biasing of the sensing parts. When a magnetic medium passes over the surface of the substrate having the sensing parts thereon, the sensing parts generate a voltage having a certain level corresponding to the sum of the bias magnetic field and a magnetic field applied by the magnetic medium. For instance, when a bank note or bill printed with a magnetic ink is passed along the surfaces of the sensing parts, voltage components corresponding to the magnetic ink pattern are caused in the sensing parts. The magnetic bias functions to raise the voltage level.

When the magnetic sensor composed of the magnetoresistance element is used for reading a bank bill for example, the pitch of the sensing parts is determined depending on the magnetic pattern to be read to connect the sensing parts with wires. When the magnetic pattern is a printing pattern of the magnetic ink, by reading this magnetic ink printing pattern, a discrimination of the bank bill can be performed.

Figure 5:
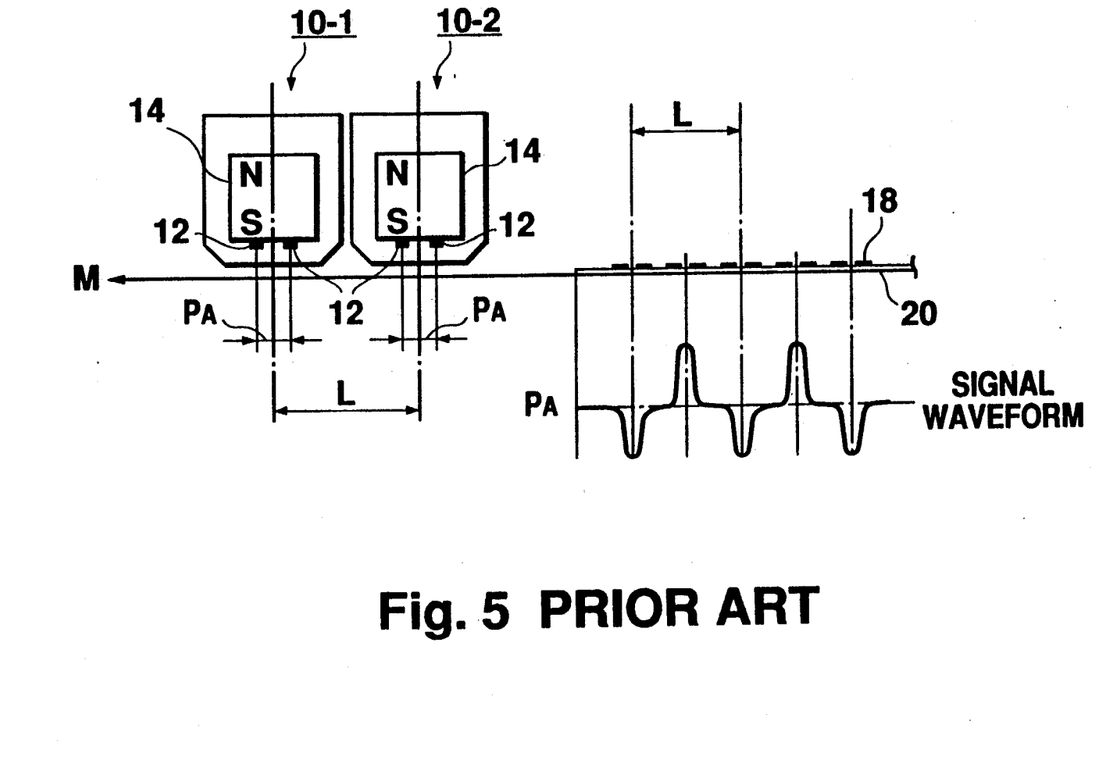
FIG. 5 is a schematic top view of a magnetic sensor assembly composed of two conventional magnetic sensors, each having a magnet and sensing parts arranged in parallel at a certain pitch and a waveform of a signal output by sensing parts when the bank bill or the like is passed along the surface of the sensor head.

In FIG. 5, there is shown a magnetic sensor assembly composed of two conventional magnetic sensors 10-1 and 10-2. Each of the magnetic sensors 10-1 and 10-2 includes two sensing parts 12, one magnet 14 for the magnetic biasing of the sensing parts 12 and an element substrate (not shown). In each magnetic sensor 10-1 or 10-2, the sensing parts 12 are arranged in parallel at a pitch $P_A$. The two magnetic sensors 10-1 and 10-2 are arranged at an interval L.

Figure 6:
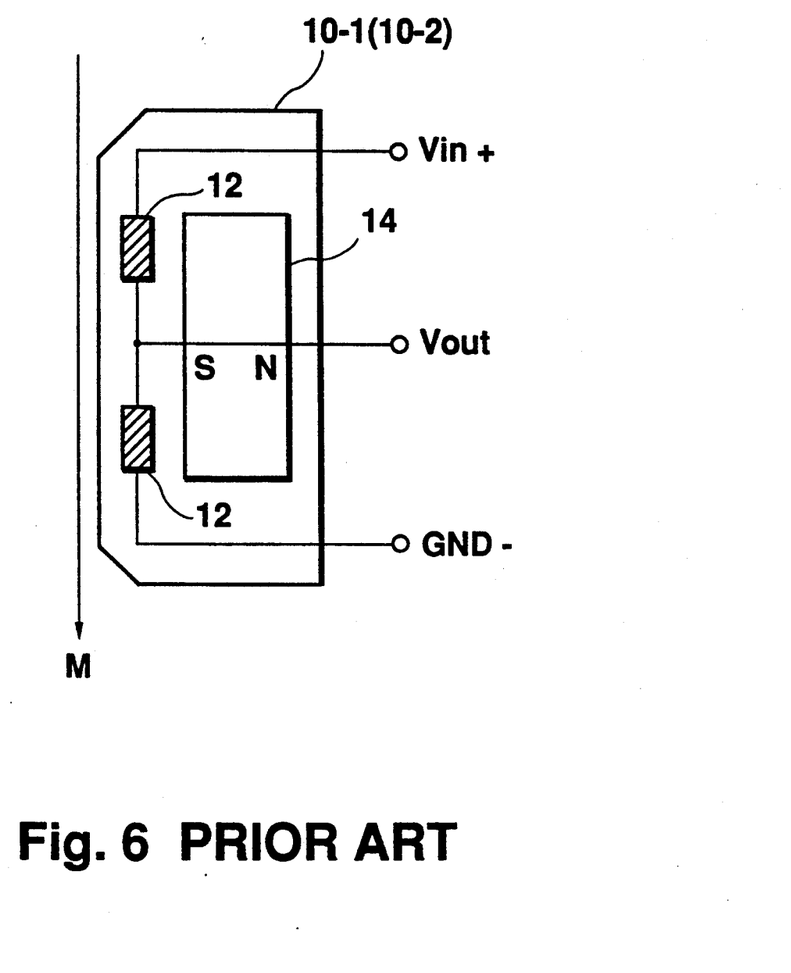
FIG. 6 is a conceptional view of a connection of the sensing parts of each magnetic sensor of the magnetic sensor assembly shown in FIG. 5.

Now, when a bank bill 20 printed with magnetic ink 18 is passed at the sensor head plane (on which four sensing parts 12 arranged) of the magnetic sensor assembly composed of the two magnetic sensors 10-1 and 10-2, the sensing parts 12 output signals having a waveform shown on the lower right hand side in FIG. 5. The sensing parts 12 of each magnetic sensor 10-1 or 10-2 are connected by wires, as shown in FIG. 6. In case of the magnetic sensor assembly composed of the two magnetic sensors 10-1 and 10-2, as shown in FIG. 5, relating to the signals output by the sensing parts 12 of magnetic sensors, one from the sensor 10-1 is delayed by a time corresponding to the interval L with respect to the other from the sensor 10-2.

As described above, conventionally, by using a plurality of sensing parts 12 which are arranged in parallel on the substrates and are connected with one another by the wires according to a certain regulation, the magnetic pattern of the bank bill for example can be read.

Figure 7:
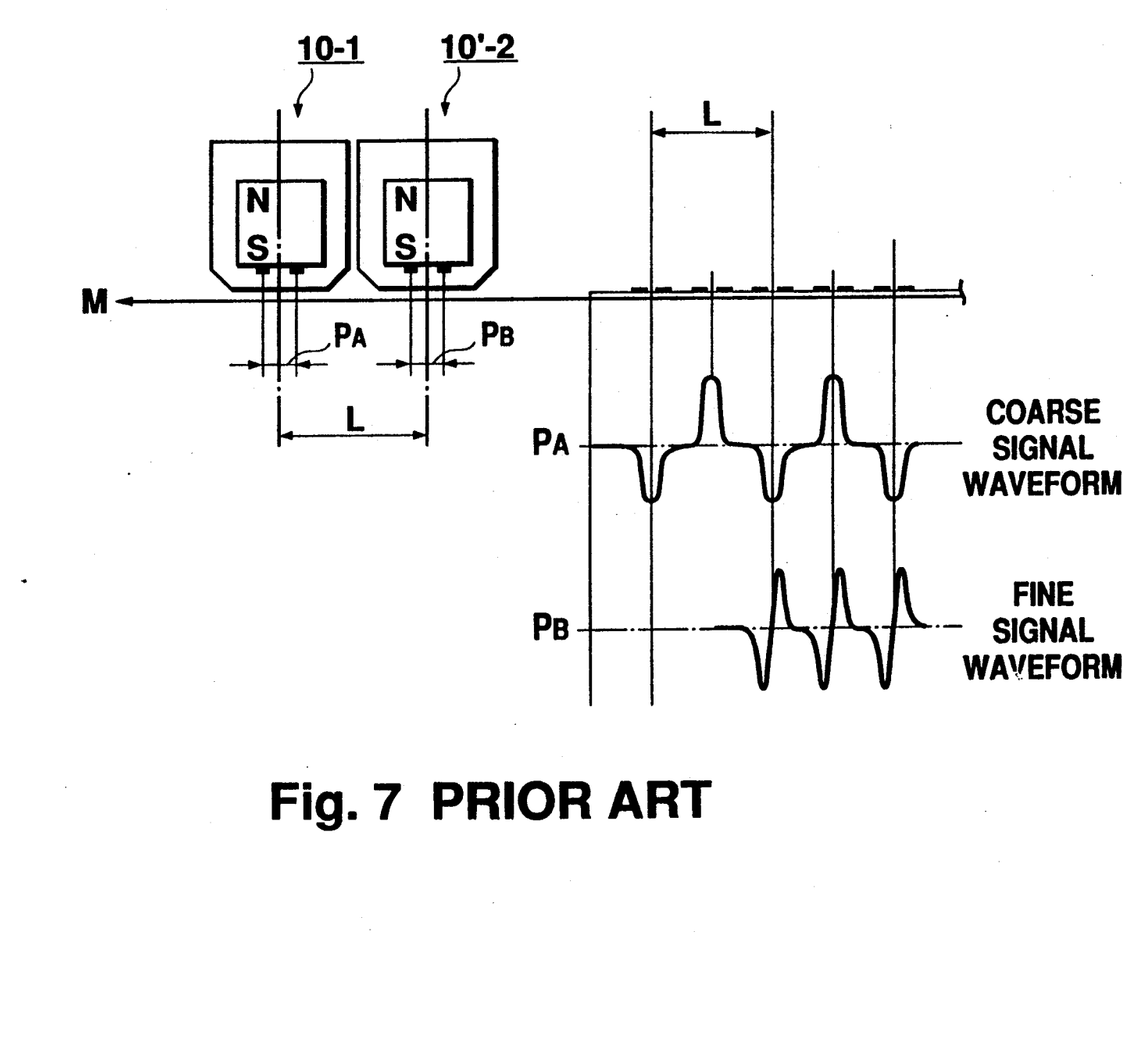
FIG. 7 is a schematic top view of another magnetic sensor assembly composed of two conventional magnetic sensors having the respective sensing parts arranged at different respective pitches and waveforms of two signals obtained in the same manner as the one shown in FIG. 5.

However, in the conventional magnetic sensor assembly, the readable magnetic pattern is restricted to the patterns concerning the pitch $P_A$. In order to overcome this problem, for example, as shown in FIG. 7, two magnetic sensors 10-1 and 10'-2 having respective sensing parts 12 arranged at respective pitches $P_A$ and $P_B$ are provided. In this case, the sensing parts 12 of the magnetic sensor 10-1 output the signal having the waveform concerning the pitch $P_A$ and the sensing parts 12 of the magnetic sensor 10'-2 output a signal having a waveform concerning a pitch $P_B$. Now, $P_A > P_B$ is determined, the waveform of the signal concerning the pitch $P_A$ is coarse and the waveform of the signal concerning the pitch $P_B$ is fine. Hence, the signal waveforms concerning the pitches $P_A$ and $P_B$ are hereinafter referred to as coarse and fine signal waveforms, respectively.

In such a construction, a new problem arises. First, the interval L between the two magnetic sensors 10-1 and 10'-2 concerning the respective pitches $P_A$ and $P_B$ appears in terms of a time lag or shift between the coarse and fine signal waveforms, as shown on the lower right hand side in FIG. 7. Further, since the positioning and mounting of the two magnetic sensors 10-1 and 10'-2 are performed by using a mechanical means, errors are liable to occur in the accuracy of the interval L, the azimuth accuracy of the sensing parts and the like, and as a result, the deterioration of the signal precision can be caused.

SUMMARY OF THE INVENTION

Accordingly, it is an object of the present invention to provide a magnetic sensor in view of the above-described problems of the prior art, which is capable of detecting coarse and fine signal waveforms without causing any time lag or shift therebetween.

It is another object of the present invention to provide a magnetic sensor capable of outputting a signal without deteriorating signal accuracy.

In accordance with one aspect of the present invention, there is provided a magnetic sensor, comprising:

a) an n (n: an integer ≧ 3) number of sensing parts, each sensing part having two ends, arranged in parallel so that the ends of the sensing parts are aligned and the sensing parts are spaced at a predetermined pitch, each sensing part generating a voltage between the ends when a magnetic field is applied;

b) first connection means for electrically connecting in series the two sensing parts arranged at a first pitch $P_A$;

c) second connection means for electrically connecting in series the two sensing parts arranged at a second pitch $P_B$ ($P_B < P_A$), the two sensing parts connected by the second connection means positioning inside the two sensing parts connected by the first connection means in the stripe form arrangement;

d) means for supplying a power source voltage to both of series connected bodies of the sensing parts;

e) means for outputting a coarse signal from the series connected body of the sensing parts arranged at the first pitch $P_A$; and f) means for outputting a fine signal from the series connected body of the sensing parts arranged at the second pitch $P_B$.

In this construction, coarse and fine magnetic patterns can be detected by a single magnetic sensor, and hence coarse and fine signals can be obtained by the single magnetic sensor. The two sensing parts concerning the fine signal are positioned inside the two sensing parts concerning the coarse signal. With this structure, almost no difference is caused in the output timings of the fine and coarse signals. Further, since the interval of the sensing parts is determined in their formation step and does not depend on their mounting, signal accuracy can be improved. In particular, this effect is remarkable when the sensing parts are formed on the element substrate by a vapor deposition, an etching or the like.

In the best connection of the sensing parts, the central line of the interval of the sensing parts connected by the first connection means is coincident with the central line of the interval of the sensing parts connected by the second connection means.

The first connection means, the second connection means, the power source voltage supplying means can be composed of wires and terminals. In this case, the wires can be used for an electrical connection among the ends of the sensing parts, a connection with a power source, a grounding and the like, and the terminals can be used for a connection of the wires with the ends of the sensing parts. In case of connecting the ends to be an equal electric potential, the ends of the two sensing parts to be connected can be integrally formed. The terminals can be formed on the element substrate.

DESCRIPTION OF THE PREFERRED EMBODIMENTS

The present invention will now be described in detail in connection with its preferred embodiments with reference to the accompanying drawings, wherein the same parts as those described above in connection with the conventional embodiments shown in FIGS. 5 to 7 are designated by the same reference characters and thus the repeated description thereof can be omitted for brevity.

Figure 1:
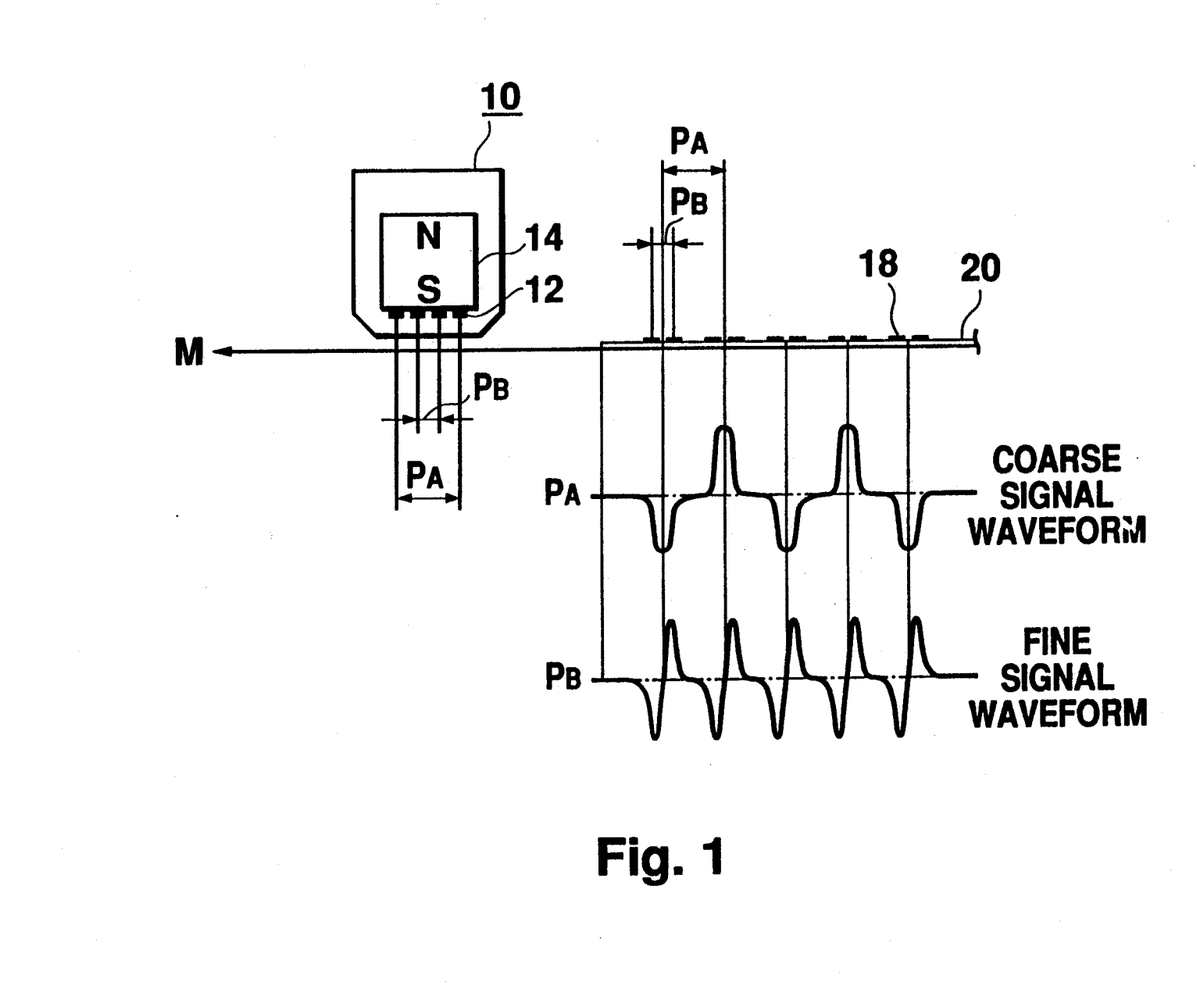
FIG. 1 is a schematic top view of a first embodiment of a magnetic sensor having a magnet and a plurality of sensing parts according to the present invention and waveforms of signals output by the sensing parts when a bank bill or the like is passed along a surface of a sensor head.
Figure 2:
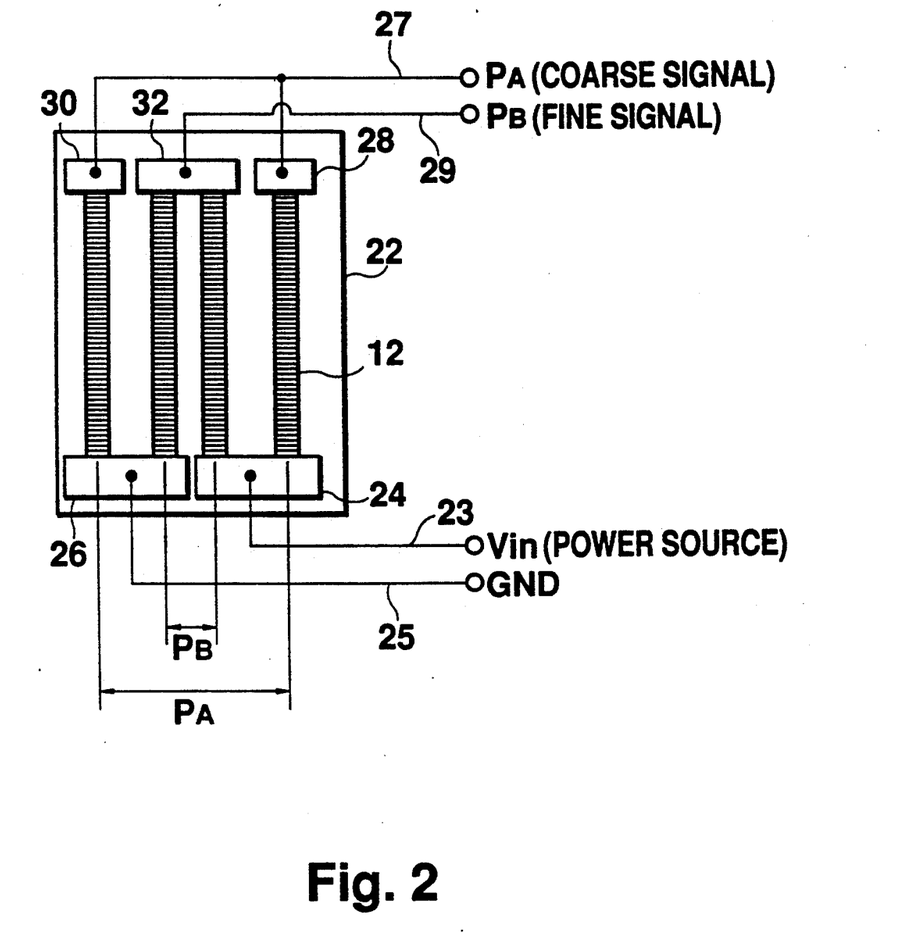
FIG. 2 is a schematic elevational view of a connection of the sensing parts of the magnetic sensor shown in FIG. 1.
Figure 3:
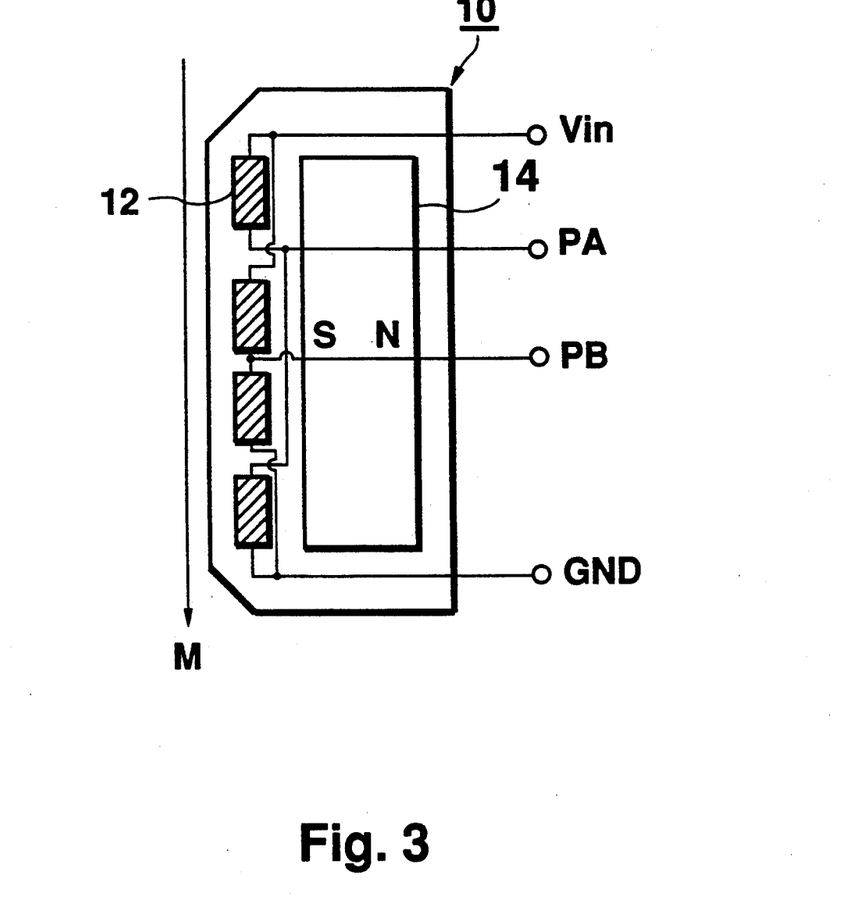
FIG. 3 is a conceptional view of the connection of the sensing parts of the magnetic sensor shown in FIG. 1.

In FIGS. 1 to 3, there is shown the first embodiment of a magnetic sensor according to the present invention.

FIG. 1 schematically illustrates a construction of the magnetic sensor. In this embodiment, as shown in FIG. 1, four sensing parts 12 are arranged in parallel within a single magnetic sensor 10. The sensing parts 12 are deposited and formed on an element substrate (not shown) by a vapor deposition, an etching or the like, and the element substrate is positioned in relation to a magnet 14. A pitch of the two sensing parts 12 at both the ends is indicated by $P_A$ (for example, 900 μm) and a pitch of the two sensing parts 12 in the middle portion is indicated by $P_B$ (for example, 300 μm). In this embodiment, the two sensing parts 12 at both the ends are used for detecting a coarse magnetic pattern, and the two sensing parts 12 in the middle portion are used for detecting a fine magnetic pattern. Hence, the two sensing parts 12 at both the ends output a coarse signal waveform concerning the pitch $P_A$, and the two sensing parts 12 in the middle portion output a fine signal waveform concerning the pitch $P_B$ ($P_B < P_A$), as shown on the lower right hand side in FIG. 1.

In FIG. 2, there is shown the parallel arrangement of the sensing parts, (hereinafter referred as sensing part pattern) of the magnetic sensor shown in FIG. 1.

As shown in FIG. 2, in this embodiment, the four sensing parts 12 are arranged in parallel on an element substrate 22. The four sensing parts 12 are connected with wires so that a power source voltage Vin may be applied and the coarse and fine signals may be output. That is, on the lower side in FIG. 2, the two sensing parts 12 on the right hand side are connected to a power source terminal 24 and the power source voltage Vin is applied to the power source terminal 24 through a wire 23. Further, the two sensing parts 12 on the left hand side are linked with a GND terminal 26 and the GND terminal 26 is grounded through a wire 25. On the upper side in FIG. 2, the two sensing parts 12 at the right and left sides are coupled with output terminals 28 and 30, respectively, and the coarse signal concerning the pitch $P_A$ is output from the output terminals 28 and 30 via a wire 27. The two sensing parts 12 in the middle portion are connected to an output terminal 32 and the fine signal concerning the pitch $P_B$ is output from the output terminal 32 via a wire 29.

The above-described connection of the sensing parts 12 is conceptionally shown in FIG. 3 in the same manner as FIG. 6. That is, the coarse signal waveform output can be obtained from the two sensing parts 12 concerning the pitch $P_A$ at both the ends and the fine signal waveform output can be obtained from the two sensing parts 12 concerning the pitch $P_B$ in the middle portion.

Accordingly, when the magnetic sensor 10 having the aforementioned sensing part pattern and sensing part connection is used as shown in FIG. 1, both the coarse and fine magnetic patterns printed on the bank bill 20 with the magnetic ink 18 can be detected. Also, different from the conventional example shown in FIG. 7, since two pairs of the sensing parts 12 are provided in the single magnetic sensor 10 and these are constructed into one unit, no accuracy deterioration by the mechanical positioning and mounting is caused. Further, the azimuth accuracy relating to the arrangement of the sensing parts 12 is determined depending on the accuracy of the vapor deposition, the etching or the like and this can be processed with relatively high accuracy. Furthermore, in this embodiment, a single magnetic sensor is provided and the central line of the sensing part pair concerning the pitch $P_A$ is made coincident with the central line of the sensing part pair concerning the pitch $P_B$. Hence, in this embodiment, the occurrence of time lag or shift between the coarse and fine signal waveforms which is due to the interval between the sensing part pairs is prevented. As described above, in this embodiment, a magnetic sensor having a higher signal accuracy and improved detecting efficiency compared with a conventional magnetic sensor can be obtained.

Figure 4:
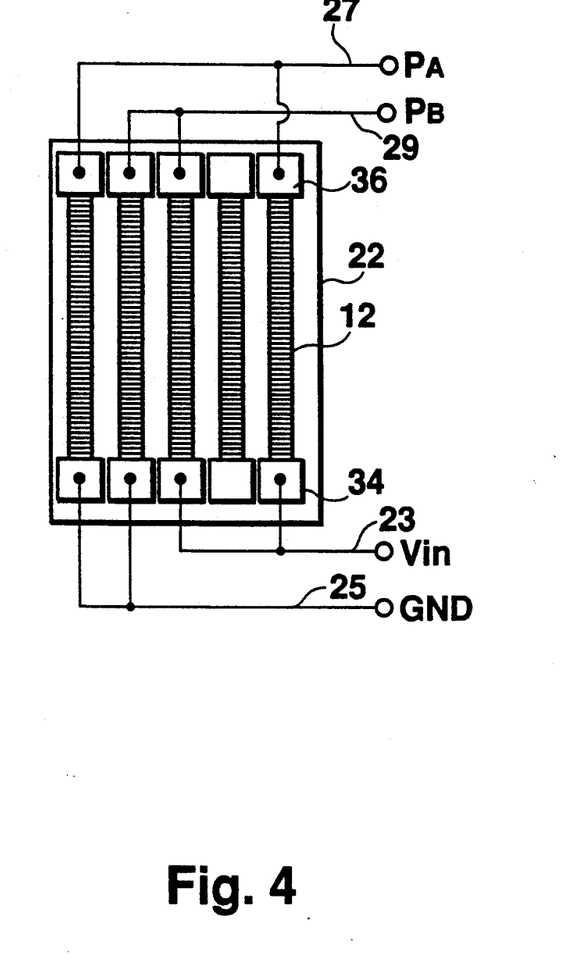
FIG. 4 is schematic elevational view of a connection of sensing parts of a second embodiment of a magnetic sensor according to the present invention.

In FIG. 4, there is shown a sensing part pattern of the second embodiment of a magnetic sensor according to the present invention. In this embodiment, different from the sensing part pattern shown in FIG. 2, the ends of a plurality of sensing parts 12 are independently formed. That is, for example, five sensing parts 12 each are separately connected to terminals 34 and 36, and the terminals 34 and 36 are connected through the wires so as to carry out the power source voltage applying and the coarse and fine signal waveform outputting in the same manner as FIG. 2.

In this case, the degree of freedom for using is higher compared with the above-described first embodiment. That is, by freely connecting the terminals 34 and 36 with the wires, a variety of pitch sizes can be realized at will. Hence, by only changing the connection of the sensing parts depending on the magnetic patterns to be read, the present magnetic sensor can deal with various magnetic patterns.

As described above, according to the present invention, since an n (n: an integer≧3) number of sensing parts arranged in parallel at a predetermined pitch or pitches are provided within a single magnetic sensor and the pitch can be selected depending on magnetic patterns to be read, a plurality of kinds of magnetic patterns can be read without causing a time lag or shift of coarse and fine signal waveforms and accuracy deterioration of these signals.

While the present invention has been described with reference to the particular illustrative embodiments, it is not to be restricted by those embodiments but only by the appended claims. It is to be appreciated that those skilled in the art can change or modify the embodiments without departing from the scope and spirit of the present invention.

What is claimed is:

1. A magnetic sensor, comprising:
   an n (n: an integer≧3) number of sensing parts arranged in parallel on a planar substrate, each sensing part having a first end and a second end the first end of each sensing part in alignment with each other, the second end of each sensing part in alignment with each other, the sensing parts being spaced from each other at a fixed distance, each sensing part formed of a material effective to output a voltage between the ends when a magnetic field is applied;
   first connection means for electrically connecting in series a first pair of the sensing parts arranged at a fixed first distance defining a first pitch $P_A$;
   second connection means for electrically connecting a second pair of the sensing parts in series and spaced at a fixed distance defining a second pitch $P_B$ ($P_B < P_A$); so that the second pair is in a physical position on the substrate that is inside a physical position of the first pair on the substrate;
   means for supplying a power source voltage to said first and second pairs of the sensing parts;
   first output means for outputting a coarse waveform signal from said first pair of the sensing parts based on the sensing of a coarse pattern by the magnetic sensor; and
   second output means for outputting a fine waveform signal from said second pair of the sensing parts based on the sensing of a fine pattern by the magnetic sensor.

2. The magnetic sensor of claim 1, wherein a central line of an interval of the two sensing parts connected by the first connection means is coincident with a central line of an interval of the two sensing parts connected by the second connection means.

3. The magnetic sensor of claim 1, wherein the first output means includes a wire for electrically connecting the two sensing parts in series at a connection point so as to output the coarse signal from the connection point.

4. The magnetic sensor of claim 3, wherein the first connection means includes two terminals so that the two sensing parts can be connected in series.

5. The magnetic sensor of claim 1, wherein the second output means includes a wire for electrically connecting the two sensing parts in series at a connection point so as to output the fine signal from the connection point.

6. The magnetic sensor of claim 5, wherein the second connection means includes two terminals so that the two sensing parts can be connected in series.

7. The magnetic sensor of claim 5, wherein the second connection means includes one terminal connected with the wire so that the one terminal short-circuits the ends of the two sensing parts to be connected in series.

8. The magnetic sensor of claim 1, wherein the power source voltage supplying means includes a wire for connecting a power source to the sensing parts.

9. The magnetic sensor of claim 8, wherein the power source voltage supplying means includes two terminals connected with the wire and the ends of the two sensing parts to be connected to the power source.

10. The magnetic sensor of claim 8, wherein the power source voltage supplying means includes one terminal connected with the wire so that the one terminal short-circuits the ends of the two sensing parts to be connected to the power source.

11. The magnetic sensor of claim 1, wherein the power source voltage supplying means includes a wire for grounding the sensing parts.

12. The magnetic sensor of claim 11, wherein the power source voltage supplying means includes two terminals connected with the wire and the ends of the two sensing parts to be grounded.

13. The magnetic sensor of claim 11, wherein the power source voltage supplying means includes one terminal connected with the wire so that the one terminal short-circuits the ends of the two sensing parts to be grounded.

14. The magnetic sensor of claim 1, wherein the sensing parts are magnetoresistance elements.

15. The magnetic sensor of claim 14, wherein the sensing parts are formed by indium antimony.

16. The magnetic sensor of claim 1, further comprising a magnet for performing a magnetic biasing of the sensing parts.

17. The magnetic sensor of claim 1, further comprising an element substrate on which the sensing parts are formed.

18. The magnetic sensor of claim 17, wherein the sensing parts are formed on the element substrate by an etching.

19. The magnetic sensor of claim 17, wherein the sensing parts are formed on the element substrate by a vapor deposition.

20. The magnetic sensor of claim 1, wherein all of said sensing parts are films of semiconductive material formed on a single insulating substrate.

21. The magnetic sensor of claim 1, wherein all of said sensing parts are connected to form a single uniform serpentine shape.

22. The magnetic sensor of claim 1, wherein said sensing parts are single, separated stripes with terminal ends.

23. The magnetic sensor of claim 22, wherein said coarse and fine magnetic patterns are ink patterns printed by magnetic ink.

* * * * *